United States Patent [19]
Bertrand et al.

[11] Patent Number: 5,142,399
[45] Date of Patent: Aug. 25, 1992

[54] MESSAGE TRANSMISSION SYSTEM

[75] Inventors: Michel P. Bertrand, Fontenay-Sous-Bois; Michel B. J. Bucher, Paris; Yves R. Castanet, Fontenay-aux-Roses, all of France

[73] Assignee: Societe Anonyme de Telecommunications, France

[21] Appl. No.: 621,230

[22] Filed: Nov. 30, 1990

[30] Foreign Application Priority Data

Dec. 1, 1989 [FR] France .................. 89 15859

[51] Int. Cl.$^5$ ............................. H04B 10/00
[52] U.S. Cl. ................................. 359/154
[58] Field of Search ........... 455/617, 618, 619, 607; 356/152, 141, 138; 280/551, 332, 206.2; 359/154, 159; 244/114 R

[56] References Cited

U.S. PATENT DOCUMENTS

| | | | |
|---|---|---|---|
| 4,134,007 | 1/1979 | Koreicho et al. | 250/237 R |
| 4,143,402 | 3/1979 | Bricot et al. | 369/44.24 |
| 4,290,844 | 9/1981 | Rotolante et al. | 250/332 |
| 4,414,532 | 11/1983 | Kaul | 244/114 R |
| 4,603,975 | 8/1986 | Cizzori | 455/617 |
| 4,675,532 | 6/1987 | Carson | 250/578 |
| 4,995,722 | 2/1991 | Sutour | 356/152 |

FOREIGN PATENT DOCUMENTS

| | | |
|---|---|---|
| 324484 | 7/1989 | European Pat. Off. . |
| 2313716 | 12/1976 | France . |
| 2352452 | 12/1977 | France . |
| 0200646 | 11/1983 | Japan .................. 455/617 |

Primary Examiner—Edward L. Coles, Jr.
Assistant Examiner—Kinfe-Michael Negash
Attorney, Agent, or Firm—Rosenman & Colin

[57] ABSTRACT

A message transmission system is operative for transmitting, over a short range, information emitted by at least one transmitter to one or more receivers, the transmitter being situated in a semi-hemispherical field above the receivers. Each receiver has optics for focusing the semi-hemispherical field on multiple detector elements of an array placed in the focal plane of the optics. The elements are responsive to the transmitted signal.

19 Claims, 11 Drawing Sheets

MESSAGE TRANSMISSION SYSTEM

BACKGROUND OF THE INVENTION

The present invention relates to systems for transmitting information emitted by transmitter equipment over a short distance to one or more receivers, the transmitter equipment being located in a semihemispherical field above the receivers.

1. Field of the Invention

The invention relates more particularly to the transmission of confidential information under the best conditions of coverage, discretion and redundancy. In fact, such ideal transmission conditions are sometimes difficult to obtain when, in such a semi-hemispherical field, there are located parasite sources. These parasite sources may be very varied. A very bright background or the sun induces noise in the receiver equipment, which is harmful to the good quality and safety in reception of the message.

The transmission system of the invention applies in particular to links between an aircraft carrier and one or more aircraft on the flight deck or else to message exchanges between patrolling aircraft, one of the aircraft then carrying the cooperative source transmitting the useful message, the other aircraft having reception systems.

2. Description of the Prior Art

A unilateral transmission system comprising an optical transmitter with modulable beam placed on the transmitting equipment, means for modulating said beam from said information, an optical detector placed on each receiver equipment and means for demodulating the signal output from the receiver is already known. Thus, the patent FR-A-2 352 452 describes a system of this type. It recommended the use of incoherent radiation so as to guarantee practically absolute discretion since the law of detection is then $1/d^2$, d being the distance from the receiver equipment to the transmitter; it further recommended to illuminate a point of the field by two or more transmitters.

This latter system applied in particular to links between an aircraft carrier and an aircraft located on the flight deck of this carrier so as to ensure transmission of an alignment message. This system used a non coherent optical carrier in the near infrared, with a wavelength of about 0.9 micron. The transmission source properly speaking was a set of LEDs of type GaAs mounted in series and modulated for all or nothing. The purpose of the optical transmission system was to form, from the beam emitted by the diodes, a beam of $\pm 1°$ in elevation and 45° or 90° in relative bearing. The whole of the beam was slightly inclined downwards and was situated at the height of the rudder units of the aircraft. Coverage of the flight deck of the carrier was provided by a combination of several transmitters oriented judiciously with respect to each other. The receiver was formed of an optical head located on the rudder unit of the aircraft and formed of six silicon photodiodes bonded to a hexagonal support so as to provide, in the plane perpendicular to the axis of said support, a practically omnidirectional reception diagram. A thin CdTe layer, placed for example on the photodiodes, eliminated a major part of the solar spectrum at reception. Anti-glare treatment favoured reception by the photodiodes of signals at 0.93 micron. The whole of the reception device was further protected by a cylindrical quartz window. A horizontal "slatted shutter" system associated with the photodiodes enabled:

illumination of the photodiodes by the sun to be prevented when the relative bearing of the latter exceeded $\pm 7.5°$, illumination thereof by the surrounding landscape to be limited. Finally, the outputs of the diodes were placed in parallel, on the receiver side, through a coaxial cable at the input of a preamplifier. The optical head assembly of the receiver, called "candle" was substantially a cylinder projecting from the rudder unit of the aircraft over a height of 8.7 cm and a diameter of 4.7 cm.

This known system provided good confidentiality. However, it has today multiple drawbacks. A first drawback relates to the reception assembly or "candle" which forms a constraint from the aerodynamic point of view, more particularly for supersonic aircraft. In fact, this reception assembly is a cylinder projecting from the rudder unit of the aircraft.

Furthermore, the above reception system comprises an omnidirectional relative bearing detector which cannot avoid the presence of parasites when the field of view contains the sun or a very bright background.

In addition, this known system does not satisfy present day requirements of discretion since the beams emitted are almost horizontal. For these latter horizontal beams, it is the atmospheric absorption and the $1/d^2$ law which ensure a certain confidentiality by attenuating the transmitted illumination, where d is the distance to the transmitter. Finally, the horizontality of the beam transmitted by the transmitter equipment forms a drawback for coverage of the aircraft carrier because of possible occultation by other aircraft of different types. The fineness of the beam prevents its use by aircraft having receivers at different heights.

SUMMARY OF THE INVENTION

The present invention proposes overcoming these different drawbacks by improving the confidentiality of the beam transmitted by the transmitter equipment, while avoiding occultation by the other aircraft lined up on the carrier in a marine application, by making reception possible by different aircraft, whatever the height of the aircraft or of their receivers.

The object of the invention is to place the transmitter(s) of the optical beam as high as possible in the masts of the aircraft carrier, all the transmitters then transmitting the same optical signal. Another object of the invention is also to provide receiver equipment capable of receiving omnidirectionally in relative bearing and in elevation.

The message transmission systems comprise means for receiving the optical signal, these reception means being formed essentially of a substantially semi-hemispherical wide angle objective and, in the focal plane of this objective, a photoreception device, said photoreception device being responsive to the radiation of said optical transmission signal.

According to a first characteristic of the invention, the photoreception device is a mosaic of n detector elements, mobile or fixed, n being a natural predetermined integer.

According to another characteristic of the invention, the mosaic is a "focal plane" mosaic known per se, for example whose elements are disposed in a line-column arrangement, said mosaic covering the field of the objective.

According to another characteristic of the invention, the mosaic is a strip formed of n detectors having the form of a sector $\Delta\alpha$ a circle centred at 0, each elementary detector $D_i$ having the form of a portion of this sector limited by two segments perpendicular to the axis of said strip, said strip being mobile about the point 0.

According to another characteristic of the invention, the mosaic is a strip having the form of a sector $\Delta\alpha$ of a circle centred at 0, each elementary detector $D'_i$ having the form of a portion of this sector limited by two segments parallel to each other and not perpendicular to the axis Ox of said strip, said strip being mobile about the point 0.

In another variant, the strip is the juxtapositioning at an angular distance $\epsilon$ of two linear semi-strips $D_{2p}$, $D_{2p-1}$ each formed of n/2 detector elements, said n detector elements being staggered from one half strip to the next, said even and uneven elements overlapping, in the direction of the axis of said strip, each gap left empty by the other half strip, said strip being also mobile about center 0.

Furthermore, in another variant, the mosaic is formed of a regular addition of m strips separated two by two by the same angular gap $\epsilon$, so as to cover the whole circumference, rotation about the center 0 of said mosaic becoming very small and equal to $\Delta\alpha + \epsilon$, said rotation being alternating or not.

In another last variant, the fixed mosaic is formed of a regular addition of q identical strips, each centered at 0, juxtaposed with an angular distance $\gamma$ so that $q(\Delta\alpha + \gamma)$ equals 360°.

In the variants of the mosaics, the gap ($\epsilon, \gamma$) separating any two adjacent detector elements $D_i$ is chosen less than the dimension of the optical spot T placed in the focal plane of the objective.

Furthermore, the mosaic is moved in the focal plane of the objective about the main focal point of this objective, so as to sweep through 360° in azimuth.

In addition, the means for driving the mosaic comprises a stepper motor whereas the mosaic is driven in rotation by a simplified drive system.

The mosaic covers an angle $\Delta\theta$ in elevation equal to 90°, the number n of detector elements being chosen judiciously.

Furthermore, the transmitter source(s) transmit in a given spectral range whereas the objective is substantially monospectral (multispectral) with narrow band(s) and the detector elements $D_i$ are chosen to be responsive to the same wavelength(s).

In addition, the spectral range is for example the infrared, the visible, the ultraviolet. The transmitting sources transmit different messages or the same message.

The system of the invention comprises means for extracting, amplifying and multiplexing over two (k) adjacent channels the signals delivered by two (k) adjacent detector elements $D_i$, means for applying said signals to the input of a processing circuit, means for discriminating the noises generated from the useful signal, means for processing the signal and extracting therefrom the modulated signal of each transmitting source.

The processing circuit of the invention comprises means for controlling the azimuth sweeping of the mosaic.

When two transmitting sources for example transmit the same signal and are placed at a certain distance from each other, at reception, the discrimination circuit, in the case where the received signal has the same magnitude as the noise generated by the sun, makes it possible to decide to search for the other noise free source, for example by means of the signal delivered by another detector element $D_j$ (respectively through azimuth modification) if the transmitting sources are placed one above the other (respectively if the sources are placed horizontally at the same height).

In addition, the position s of detector $D_s$ receiving the signal sought makes it possible to derive therefrom at the output of the control circuit and control the coordinates of the source sought.

BRIEF DESCRIPTION OF THE DRAWINGS

The invention will be better understood from the following description with reference to the accompanying drawings in which:

FIG. 4a shows a sectional view of the optical path of the incident signal in the device of FIG. 4 according to the invention as far as its arrival in the focal plane of the objective;

FIG. shows one example of a circuit for multiplexing the signals delivered by sixteen detectors over two adjacent simultaneous channels;

DESCRIPTION OF THE PREFERRED EMBODIMENTS

The following detailed description concerns an application to an aircraft carrier in which information is communicated from the control tower to the aircraft ready for take-off. But it is obvious that the present invention is not limited to such an application, as will be clear hereafter.

Figure 1:
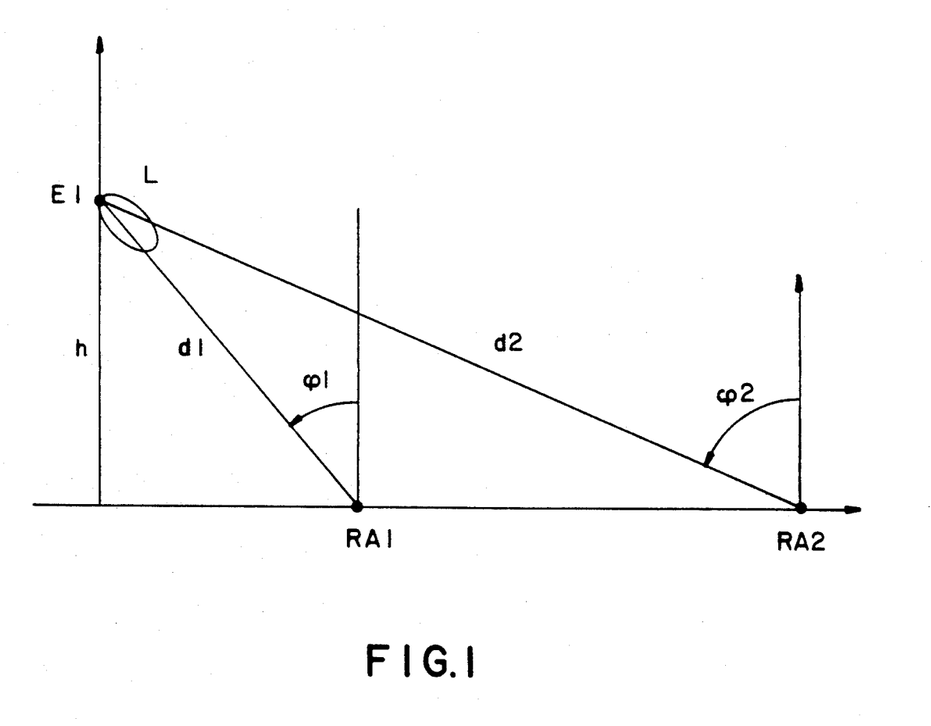
FIG. 1 is one example of a relative transmitter-receiver arrangement in an aircraft carrier application.

Referring to FIG. 1, $E_1$ is an optical beam transmitter placed in the masts of the aircraft carrier and transmits a signal received by receivers $R_{A1}$ and $R_{A2}$ of aircraft $A_1$ and $A_2$. The useful power received by receiver $R_{A2}$ depends essentially on its position with respect to the source, on the radiation diagram of source $E_1$, and on the meteorological conditions for example. For a circular radiation diagram, the power received by receiver $R_{A1}$ is greater than that received by receiver $R_{A2}$. To optimize as much as possible the power received by all the receivers of the aircraft carrier, it is therefore desirable to place transmitter $E_1$ as high as possible in the masts. The transmission diagram may then be directed downwards, which obtains multiple advantages, such as:

ensured discretion beyond 100 to 200 meters from the aircraft carrier, an absence of occultation by the other aircraft lined up on the deck, good reception whatever the height of the aircraft or their receivers.

A height of about 25 m may be reasonably envisaged in the aircraft carrier application, for placing transmitter $E_1$ in the masts. A cooperative source $E_1$ of the system may for example be formed of several diodes, for example made from GaAs emitting at 0.9 micron (200 mW per diode) or from GaAlAs emitting at 0.81 micron (up to 10 W per diode) associated with transmission optics. The source may for example be modulated at 100 kHz and with a useful passband for the message of 20 kHz. Receivers $R_{A1}$ and $R_{A2}$ of the invention have the feature of being omnidirectional in the upper hemisphere as will be clear hereafter.

Figure 2:
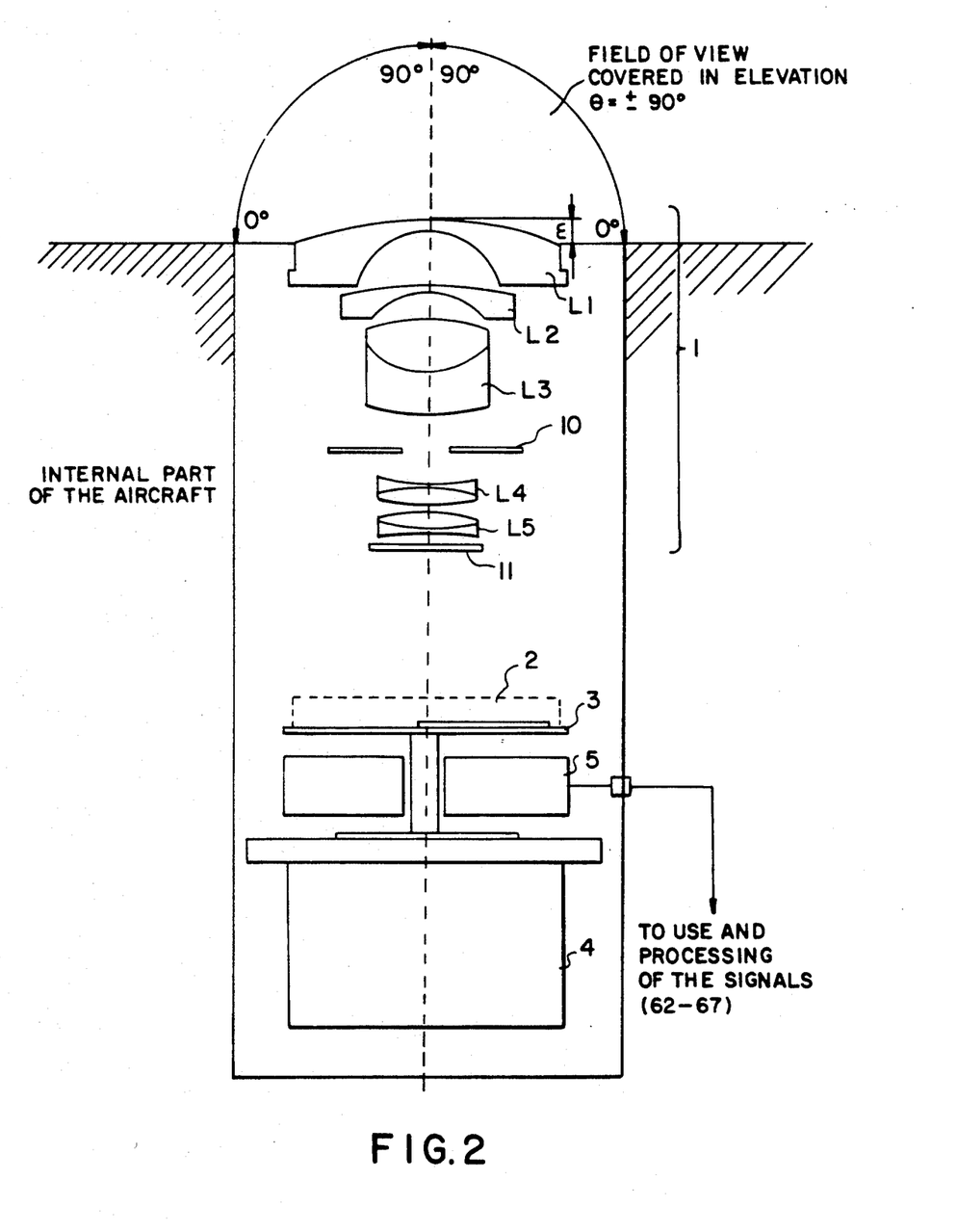
FIG. 2 shows one example of electro-optical receiver equipment carried by the aircraft.

FIG. 2 shows the electro-optical head of the receiver equipment carried by the aircraft. This electrooptical head is formed essentially of a wide angle objective 1 of fish-eye type, for example formed of a plurality of lenses $L_1$, $L_2$, $L_3$, $L_4$, $L_5$ with a circular field of view capable of covering in elevation a field of $\pm 90°$. The omnidirectional objective 1 is for example formed of a convergent group of three lenses $L_1$, $L_2$, $L_3$ forming an intermediate image of the input pupil (whatever the direction of the incident beam) at the level of a metal screen 10 with circular aperture, and a group of two lenses $L_4$, $L_5$ forming the image of all the points of the semi-hemispherical field of the objective 1 in the plane of plate 3. Such an objective 1 emerges from the aircraft over a very small thickness (for example, about 6 mm). The circular screen 10 is sufficiently set back from the outer wall of the aircraft to provide perfect protection for the system of the invention against radioelectric transmissions.

Moreover, the spectral filter 11, thus placed between the input objective 1 and plate 3, limits before detection the light flow received to the useful spectral passband alone, i.e. that of the cooperative source.

Figure 5:
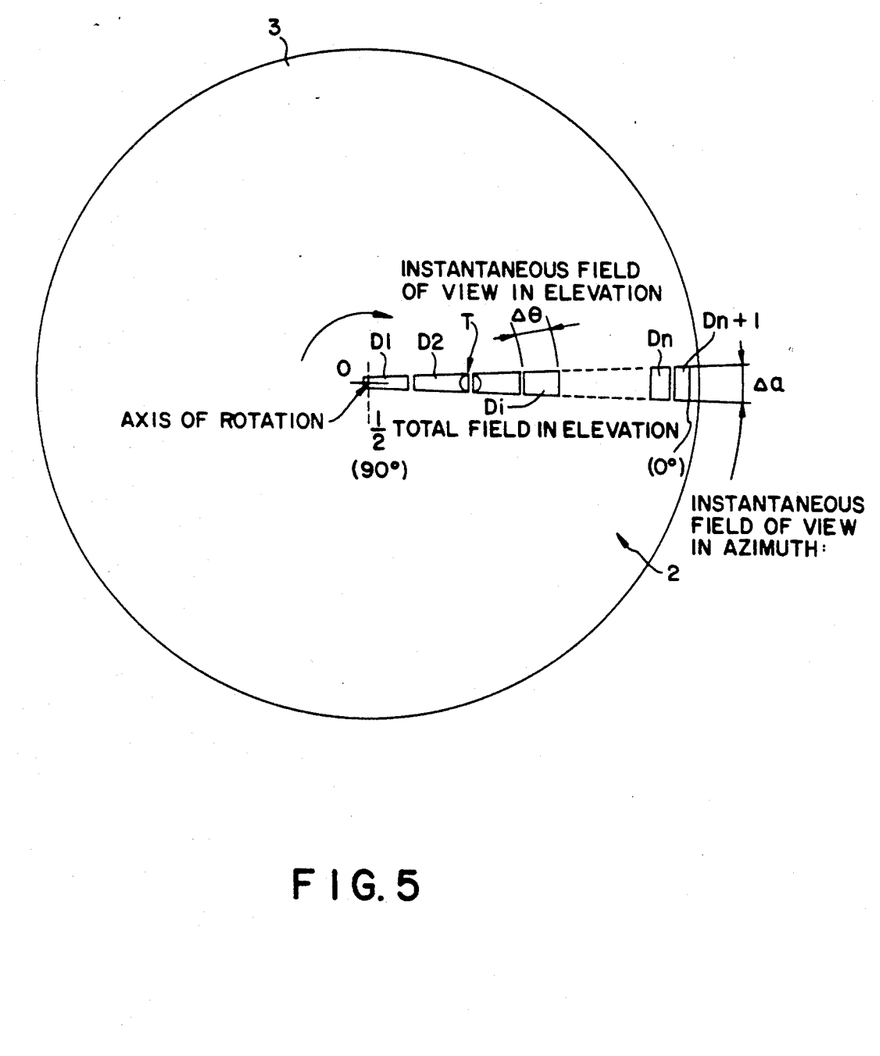
FIG. 5 shows a top view of a detection strip according to the invention.

On plate 3, focal plane of objective 1, is placed a linear strip 2 formed of n detectors covering an instantaneous field of 90° in elevation and $\Delta\alpha°$ in azimuth. This strip 2, shown from the top in FIG. 5, is for example formed of a plurality of elementary detectors $D_1$, $D_2$, $D_3$, $D_4$, ... $D_n$, each detector $D_i$ being for example a photodiode, reversely biased for reducing its capacity which is a source of noise. The elementary detectors $D_i$ have a structure in the form of a sector defined by two arcs of a circle with the same center 0, the main focal point of objective 1. These arcs of a circle are substantially comparable to segments of parallel straight lines.

This structure of detectors $D_i$ is explained in the following way: an azimuth sector element corresponds in the focal plane of objective 1 to a sector of the circle defining the field of view of this objective 1 in azimuth. An elevation portion corresponds, in this same focal plane, to a circular ring centered on focal point 0 of this same objective 1. The intersection of an elevation portion and an azimuth sector determines the form in the focal plane of a detector element $D_i$ it is the surface forming the intersection of a ring by a sector (FIG. 3b).

Such a choice of detectors $(D_i)_{i=1,n}$, the number n representing the number of detectors of a strip 2, confers on each detector $D_i$ an instantaneous field of view in elevation very much less than 90° (on average 90°/n) and an instantaneous field of view in azimuth of about $\Delta\alpha = 360/p$, p being an integer chosen appropriately.

Figure 3A:
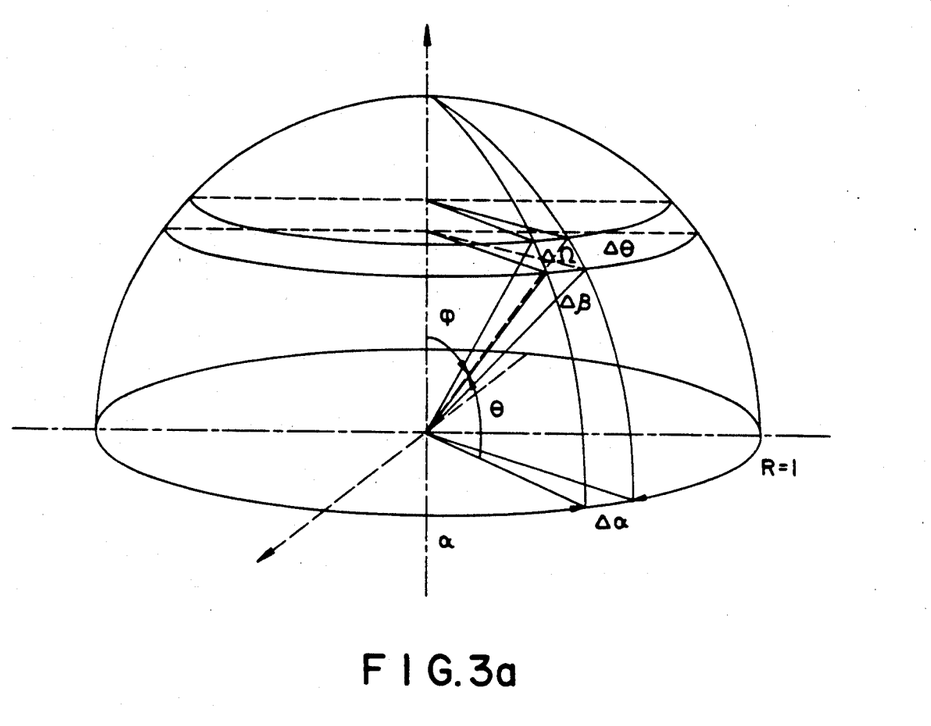
FIG. 3a shows a portion of the space seen by a detector element and FIG. 3b shows its projection in the focal plane of the objective.
Figure 3B:
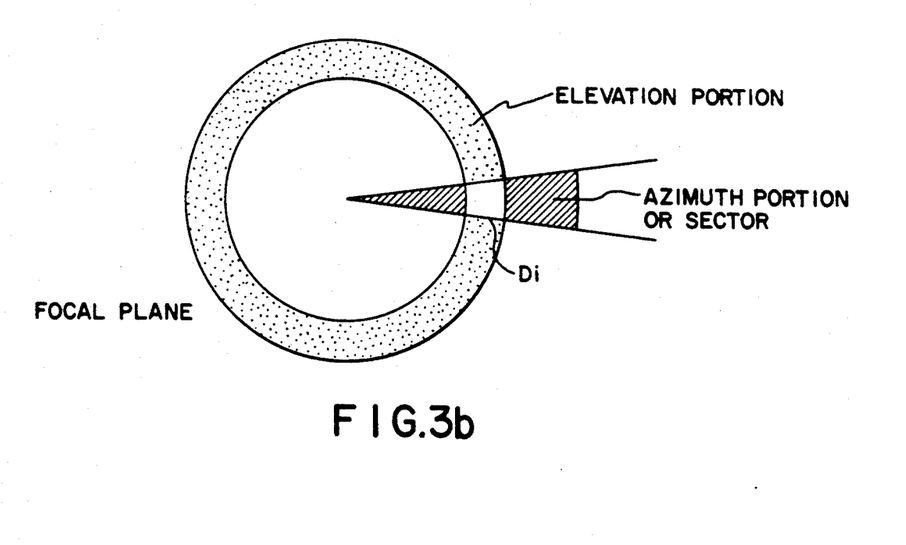

FIG. 3a shows the portion of the space seen by a detector element $D_i$ according to the invention. $\Delta\Omega$ represents the solid angle of the space seen by a photodetector element $D_i$. This solid angle $\Delta\Omega$ written:

$$\Delta\Omega = \Delta\beta \cdot \Delta\theta$$

$\Delta\theta$ being the elevation portion and $\Delta\beta$ being the angle portion which is perpendicular thereto; the elementary azimuth angle $\Delta\alpha$ related to $\Delta\beta$ by the relation $$\Delta\alpha = \frac{R\Delta\beta}{R\cos\theta} = \frac{\Delta\beta}{\cos\theta}$$

namely $\Delta\beta = \Delta\alpha \cos\theta$ whence the elementary solid angle $\Delta\Omega = \Delta\alpha\Delta\beta$. When $\Delta\alpha$ is small and $\Delta\theta$ finite, $\Omega$ is written:

$$\Omega = \Delta\alpha \int_{\theta_1}^{\theta_2} \cos\theta \, d\theta$$

$$\Omega = \Delta\alpha(\sin\theta_2 - \sin\theta_1)$$

or else as a function of the angle $\phi = \pi/2 - \theta$ $$\Omega = \Delta\alpha(\cos\phi_1 - \cos\phi_2) \tag{1}$$

The values $\phi_1$ and $\phi_2$ are in particular related to the distances of the segments defining each detector $D_i$.

Figure 4:
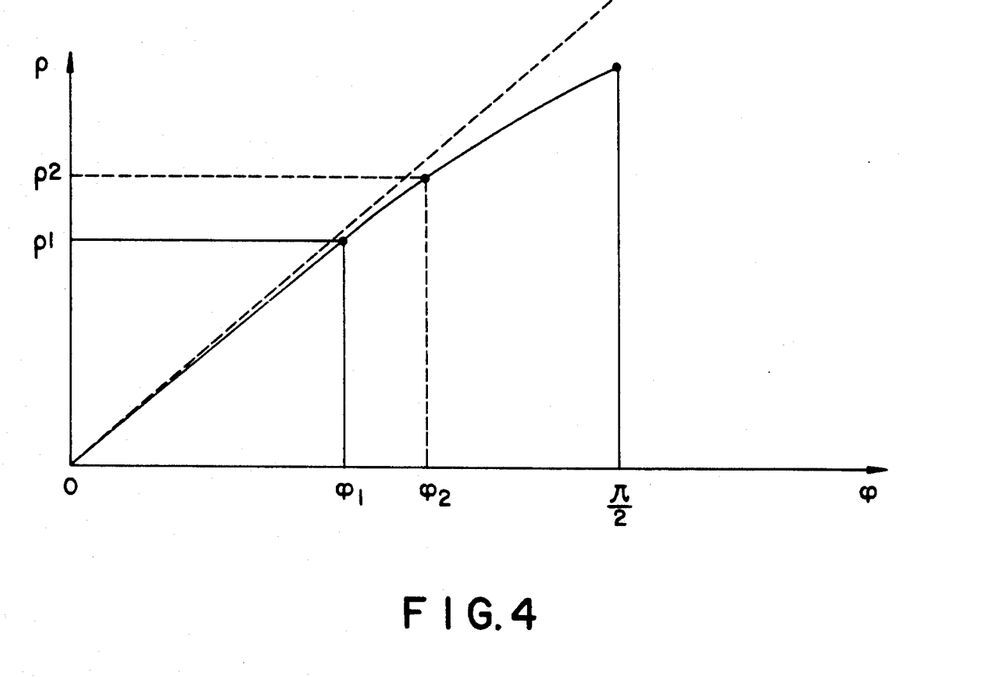
FIG. 4 shows the curve of variation of the distance between the main focal point and the image of the transmitting source in the focal plane as a function of the angle of incidence of the light beam received.

FIG. 4 shows, for a certain wide angle objective, the curve representative of $\rho$ as a function of the angle of incidence $\phi$ of the light beam received, where $\rho$ is the distance between the main focal point 0 of objective 1 and the image of the transmitting source assumed pinpoint in the focal plane. For small angles $\phi$, $\rho$ varies substantially linearly as a function of the angle of incidence $\phi$. On the other hand, when the angle of incidence $\phi$ approaches $\pi/2$ (receiver very far away), the distance $\rho$ varies less quickly than the angle of incidence, so that for the same elementary angle $\Delta\phi$, the dimension $(\rho_2 - \rho_1)$ of detector $D_j$ is smaller, as illustrated in FIG. 4a.

The disadvantage of being able to detect in an extended space in elevation is the increase of external noise sources. To reduce this noise, a strip 2 is used formed of n detector elements $(D_i)_{i=1,n}$.

In fact, the smaller a detector element $D_i$ and the more this element covers a small solid angle, the lower the noise. Consequently, as long as the solid angle of each element $D_i$ is greater than the angle of view of the source and provided that the optical spot at M in the plane of plate 3 remains less than the size of element $D_i$, the sensitivity is improved with the increase in the number n of detector elements $D_i$.

With respect to a monodetector system, a strip 2 with $D_i$ elementary detectors provides a considerable gain: if the mean instantaneous field of view of an elementary detector $D_i$ is $(90/n)\Delta\alpha$ degrees squared, taking the case where n=16 and $\Delta\alpha=360°/160$, the solid angle of view $\Omega_i$ of this detector $D_i$ is equal to $5.56° \times 2.25°$.

The ratio between the total angle of view of objective 1 and the elementary solid angle $\Omega_i$ of this detector $D_i$ gives the number 1647. Between a single detector covering the field and detector $D_i$ of the invention, the noise due to the external background is divided by $\sqrt{1647}$, i.e. about 40, which provides a gain of 32 dB.

Cutting up of the detection strip 2 into n detector elements $D_i$ in the elevational direction, as shown in FIG. 5, is carried out to optimize the signal to noise ratio obtained along the strip 2, in particular the noise depends on the following parameters:
distribution of the luminances in the sky,
reception elevation angle, the absorption of the solar radiation being all the higher the greater this angle,
the continuous power received from the background by the corresponding element given by $P=L_f \times \Omega$ ($L_f$ luminance of the continuous background, $\Omega$ solid angle seen by this detector element) (relation 1),
the capacity $C_d$ of the detector element and that of the wires connecting to the preamplifier.

The noise proportional to $\sqrt{P}$ decreases with the power received from the background. The signal received depends on the intensity I of the radiation emitted by the angle of incidence $E_1$ in the direction of the receiver, on the distance D from the receiver to this source which depends on the angle $\phi$ and on the height h of the transmitter and finally on the atmospheric transmission $\tau$ over the source-receiver path.

It may be written that the signal is proportional to $$\frac{\tau I}{d^2}$$

with $d = h \tan \phi$

When the background does not limit the performances of the detector, it is the capacity $C_d$ of the detector itself associated with its preamplifier which is the main source of noise. Under these conditions, it is again found that the noise is all the lower the smaller the area of the detector.

For example detectors $D_n$ the furthest away from the optical axis analyse the landscape in the vicinity of the horizon ($100 \approx \pi/2$). Now, in the vicinity of the horizon, the direct and diffuse emission of the sun is lower so the noise will be less: it is the capacity of the detectors proportional to their area which is the greatest source of noise. But for these detectors, distance d is large (FIG. 1).

The choice of the area of the detector elements results then from different compromises and in particular from the radiation diagram of the source. In the application envisaged, if a parasite source is small with respect to a detector $D_i$ (for example the sun forms 0.5°), the increase in the number of detector elements and decrease of the angle of view of each of them reduces the probability of being affected by parasites but does not decrease the intensity of this parasite when it occurs.

Thus, in the presence of the sun, in the case of an aircraft carrier, coverage of the deck by transmitter $E_1$ will be all the better the smaller the sensitive area of the detector element $D_i$. Only a detector $D_j$ placed in the transmitter-sun alignment will be affected by noise; this detector does not then provide its fraction of coverage of the deck.

To solve such a case, the transmission system of the invention recommends using two sources $E_1$ and $E_2$, each emitting the same coded signal, placed at the same height in the masts of the aircraft carrier at a distance for example of about 15 m. The relative heading angle between the two sources $E_1 E_2$ is then greater than 4°, which, compared with the 0.5° disturbed by the sun, ensures good reception of the useful message at the level of one of the detectors of strip 2 coming from the transmitter the furthest from the sun, so less affected by parasites.

It will be noted that, in such a particular case where the relative heading angle between the two sources $E_1$ and $E_2$ of the same group is greater than 4°, it is greater than the azimuth coverage of strip 2 (for example equal to 360°/160, i.e. 2.25° where p is chosen equal to 160).

The fact of placing two cooperative sources $E_1$ and $E_2$ in the masts of the aircraft carrier instead of a single source has the further advantage of increasing the reliability of the system for the risk of breakdown of a transmitter is not zero. The sources $E_1$ and $E_2$ may further be placed one above the other.

For sweeping the field in azimuth, the strip 2 of the invention is placed, according to the invention, on a plate 3 placed in the focal plane of an objective 1. This plate 3 rotates about the main focal point 0 of this objective 1, for example by means of a stepper motor 4 placed under this plate 3 as shown in FIG. 2. The step of motor 4 is chosen very small, for example 200 or 400 steps, i.e. 1.8° or 0.9°. This motor rotates at a slow speed, for example 1 rps. To provide the electric connections between the electronics situated on this plate 3 and the fixed exploitation electronics, a rotary seal 5 is for example inserted between this plate 3 and motor 4. It enables plate 3 to rotate freely over $k \times 360°$. But it is further possible to use a simple strand for extracting the signals, which confers freedom of rotation of $360° \pm$ a few degrees.

Figure 6:
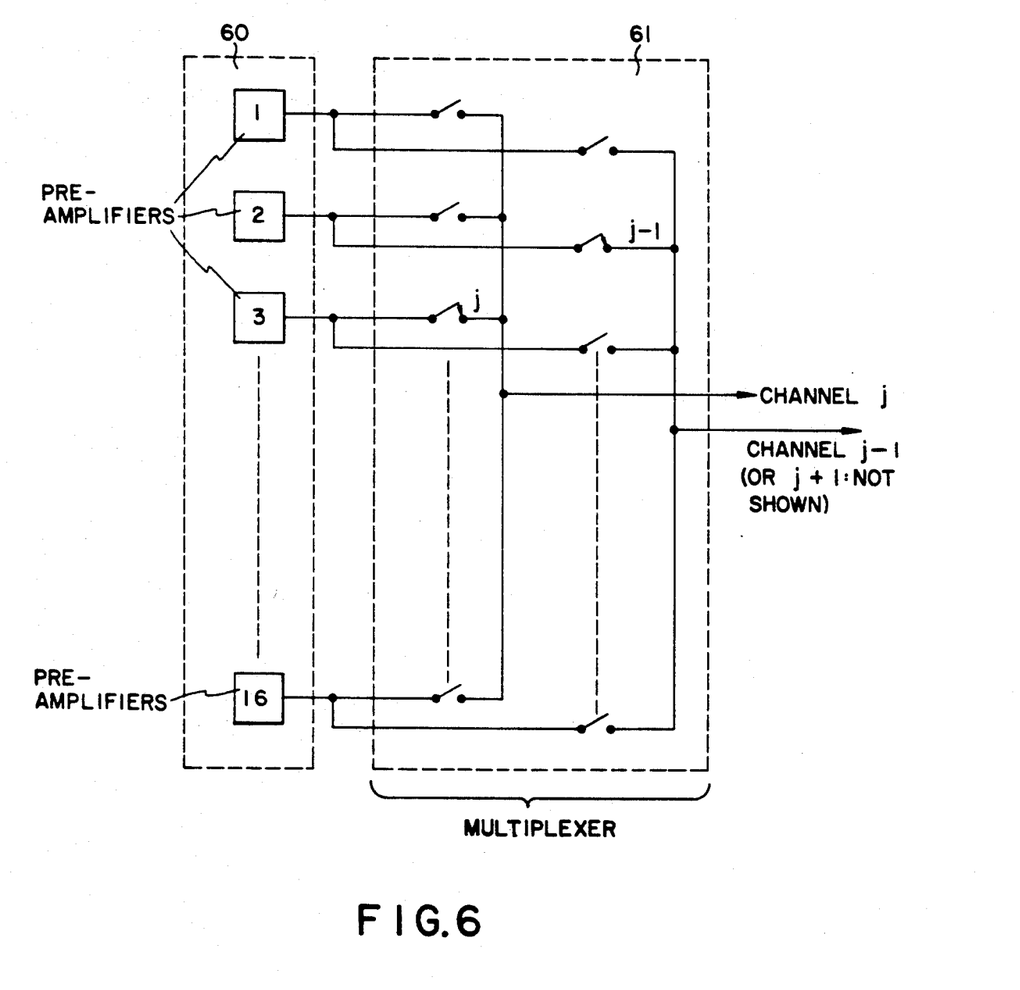

Besides strip 2 of the invention, plate 3 also supports n preamplifiers 60 and electronic circuits for extracting the signals received by each detector $D_i$ as shown in FIG. 6. The purpose of these circuits 60 is to bias detectors $D_i$, amplify the signals received and apply them to the input of a multiplexing circuit 61.

Figure 7:
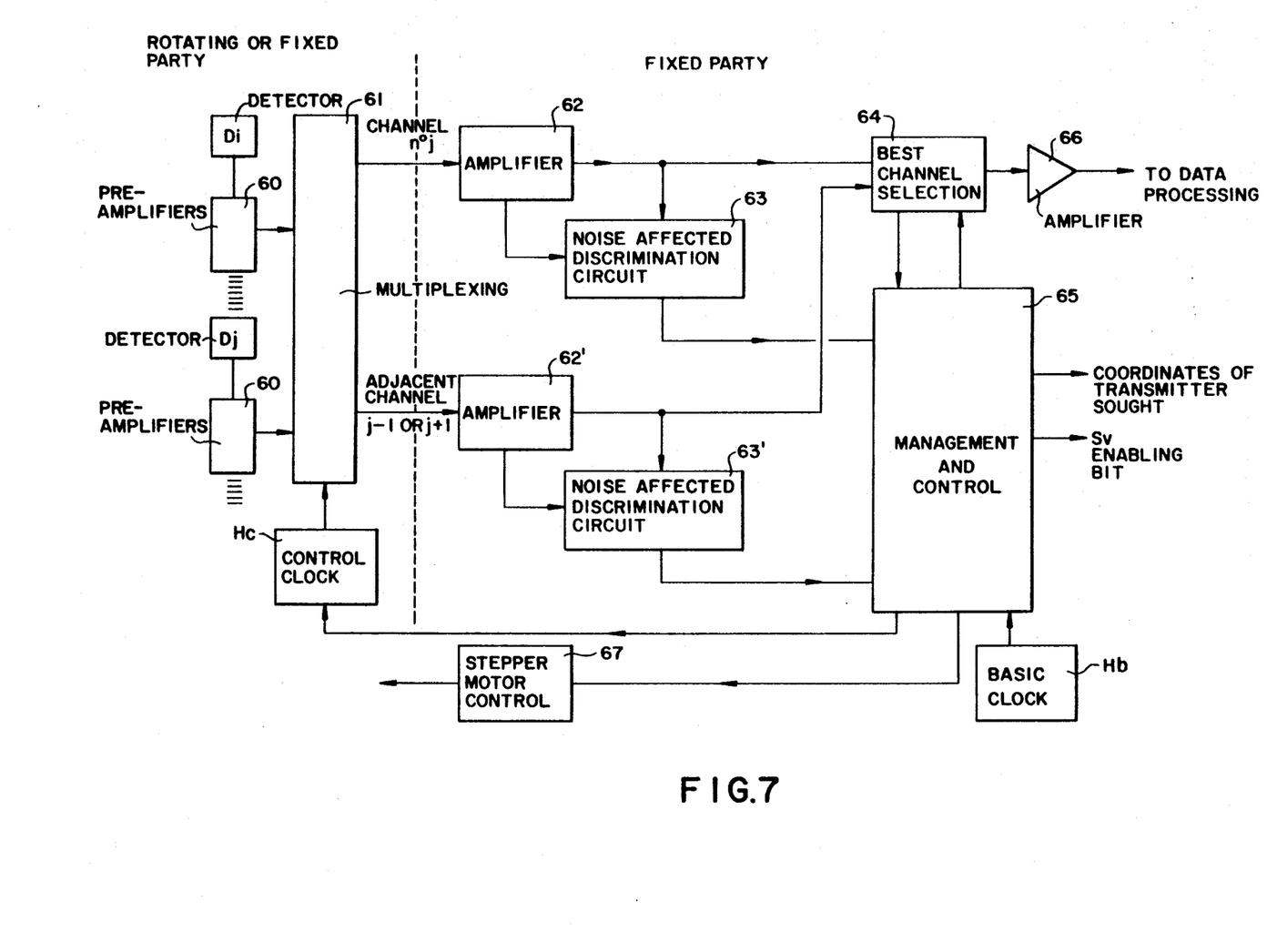
FIG. 7 is a block diagram of the device for processing the signals received.

The preamplifier-detector integration is sufficiently miniaturized to avoid parasite inductions in the electric connection. These preamplifiers 60 are for example integrated operational preamplifiers with low noise. They are quite suitable for detecting messages with a passband of 20 kHz and a central frequency of 100 kHz. The multiplexing circuit 61, shown schematically in FIG. 6 by 2n switches representing the opening or closing of gates of the adjacent channels j and j±1 supplies the signals from the n detectors $D_i$ over two simultaneous adjacent channels. This circuit 61, carried by plate 3, thus makes it possible to read two contiguous detector elements $D_j$ and $D_{j\pm1}$ at the same time. A clock $H_c$ external to plate 3 controls the opening and closing of the gates of the channels as shown in FIG. 7.

These signals of channels j and j±1 from multiplexer 61 are applied respectively to the input of the filter amplifiers 62, 62'. These filter amplifiers 62, 62' form part of the fixed processing circuits outside plate 3 whose role is essentially to use the two signals from multiplexer 61, i.e. to search for and if necessary track the cooperative source $E_1$ so as to obtain a stable signal emitted by this source $E_1$ and extract the useful message therefrom. These fixed processing electronics further comprises two circuits 63, 63' for discriminating the noise affected signals (for example affected by noise by the sun). Each discrimination circuit 63, 63' receives the input signal from circuit 62, 62' and the output signal of this same circuit and delivers the result to the input of the management and control circuit 65. The amplifier circuits 62, 62' also deliver their output signal to the input of a circuit 64 selecting the best channel (j, j±1). The result of the selection made by circuit 64 is delivered to the management and control circuit 65 as well as to an amplifier circuit 66. This circuit 66 receives the filtered signal in its useful passband and delivers it, after amplification and chopping or shaping, to a known data processing device.

The management and control circuit 65 is timed by a basic clock $H_b$. This circuit 65 has multiple functions: it delivers a signal to the input of the clock $H_c$ controlling the multiplexer 61 for initializing an operation over two adjacent channels (j, j±1). It also delivers a signal to the circuit 67 controlling the stepper motor 4: it further delivers a signal to the circuit 64 selecting the best channel j or j±1 it delivers an enabling signal $S_v$ to the circuit decoding the information (not forming part of the present patent); finally, it supplies the angular coordinates of the sought and found transmitter.

The circuit 65 carries out the multiple computing operations for channel selection and decision to follow up the tracking and switching thresholds between search and tracking. In fact, when the sighting direction of the cooperative source has been found, the stepper motor 4 stops on the corresponding azimuth direction and the multiplexing circuit 61 supplies the channel j among the n channels corresponding to the n detectors as well as the adjacent channel j±1. Circuit 65 controls the delivery by circuit 64 of the signal filtered in its passband and intended for a circuit not shown for decoding the information.

Figure 8:
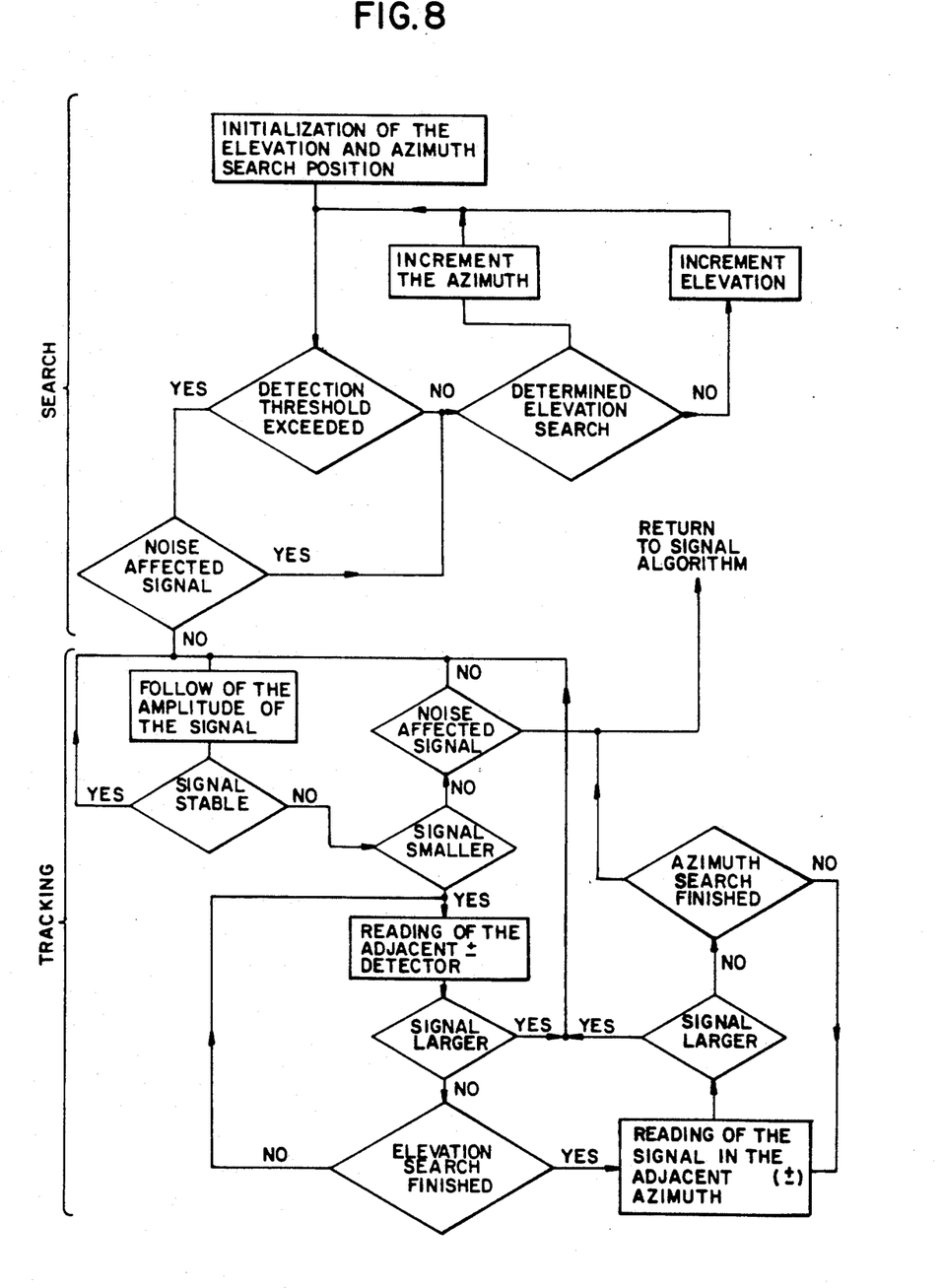
FIG. 8 is an algorithm for seeking and tracking the modulated source.

FIG. 8 illustrates an algorithm for searching for and tracking the source in the presence of solar parasite noise. The system is initialized for a given position in elevation and in azimuth. The azimuth search is carried out by the stepper motor which drives plate 3; the elevation search, on the contrary, is effected by the multiplexed reading of the n detector elements $D_i$, which reading is carried out in the period of one step of the motor. The clock $H_b$ controls both the speed of rotation of the motor and clock $H_c$ addressing the multiplexer 61. This makes possible synchronization between the step by step rotation of plate 3 and the multiplexing of the 2n channels.

It will be noted that the holding time of a channel at the input of multiplexer 61 must be very great, during the search phase, with respect to the mean period of the measured signals, which involves a limited speed of rotation for plate 3.

In the above numerical example where p is chosen equal to 160, the passage time of the image of the cooperative source over detector $D_i$ during the azimuth search is equal to 1/160, i.e. 6.25 ms.

The time for multiplexing the signal detected by a detector $D_i$ is less than 6.25/n, i.e. 390 microseconds. If the frequency of the signal is 100 kHz, a period of this signal lasts 10 microseconds, which allows the signal to be correctly analyzed.

During the time for reading a detector $D_i$, after a short time for establishing the received signal, the amplitude of the signal is compared with a detection threshold: in the case where the threshold is exceeded, it is checked (FIG. 7) whether the signal is not noise induced by the too violent illumination due to the sun, by means of circuit 63 for discriminating noise affected signals.

A method for carrying out such processing is to measure the effective value of the signal between two different electric bands, the narrowest band corresponding to the useful band of the modulated signal of the cooperative source. If the signal received is indeed the useful signal, the two effective values are equal; in the opposite case, the ratio of the measured values depends on the ratio of the electric passbands chosen.

Depending on the applications, it may be that the detector circuit associated with its preamplifier is saturated in the presence of sun. Therefore, in this case, there is no modulated signal at the output of the preamplifier and so no risk of error in the search for the cooperative source. The detection threshold is chosen so that the false alarm rate remains acceptable in the required application.

If the detection threshold SD has not been exceeded, a new azimuth is incremented until this threshold is effectively exceeded.

When the source is thus found, the tracking algorithm is used for palliating the slow evolutions due to the relative movements between the transmitter (cooperative source) and the receiver (detector $D_i$). Then the evolution of the amplitude of the signal from circuit 64 is sought. If the amplitude of the signal decreases in a certain ratio represented by a stability threshold, it is necessary to initiate tracking of the source.

The tracking algorithm may then provide for two cases of non stability of the signal.

If the signal becomes larger, the same circuit 63 is used for discriminating noise affected signals as during tracking for deciding on the search for a second source.

If the signal has decreased, the amplitude obtained on the adjacent detector elements is read first of all; comparison is facilitated by the simultaneous presence of the signals of channels j and j±1. If the signal has not found its preceding value again, an azimuth rotation is carried out of ±1 step so as to obtain the optimum voltage level.

This makes it possible to provide for too high an increase of the signal, due for example to the slow passage of the sun in the vicinity of the source; and if the signal leaves its range of stability, the tracking algorithm makes it possible to solve in the same way the search for the cooperative source.

The management and control circuit 65 is charged with a multitude of functions, such as switching between the search phase and the tracking phase, comparison between the amplitudes of signals and the corresponding thresholds $S_d$, the decision as a function of the results of the comparisons and the quality of the signal, management of the clock $H_c$, control of the stepper motor, control of the multiplexing, calculation of the tracking threshold necessary for following the amplitude of the signal, elaboration of a bit for enabling the signal applied to the selection circuit 64. This circuit 64 may be formed either in hard wired logic, or by means of a microprocessor having a system for acquiring and digitizing the analog voltages representing the amplitudes of the signals.

In the above case where two cooperative sources are placed at the same height and transmit the same message, let us assume that one of the two sources $E_1$ and the sun are seen at the same time by the same detector element $D_i$ and let us assume that the noise generated by the sun is of the same order of size as the signal received. The signal-noise discrimination circuit 63 then makes it possible to become aware of it and to decide to continue the search for the other noise-free source $E_2$, for example by means of another detector element $D_j$ if the two sources are vertically superimposed, for example by means of another azimuth if the two sources are placed at the same horizontal position. Thus, during tracking and following of the amplitude of the signal, if the signal has increased, it is advantageous to use the same noise affected signal discrimination circuit 63 to decide on the search for the second source.

Figure 9:
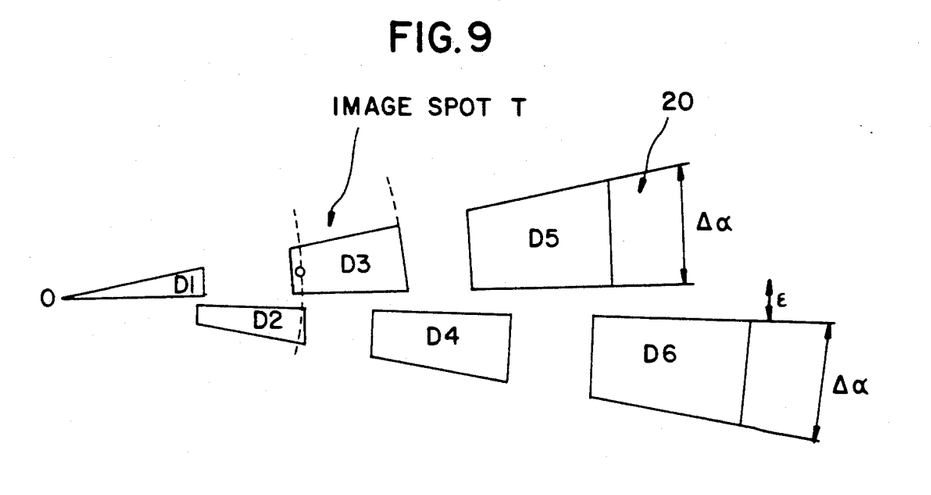
FIG. 9 shows a particular case of a strip formed of two half strips, each comprising n/2 elements placed in a staggered arrangement.

FIG. 9 shows a variant of the detection strip of the invention. Strip 20 of FIG. 9 is in actual fact the juxta-positioning at a suitably chosen angular distance $\epsilon$ of two linear semi-strips similar to strip 20 each formed of n/2 detector elements $D_i$, each semi-strip being also centred at 0, the focal point of objective 1. The n detector elements are disposed in a staggered arrangement from one semi-strip ($D_2, D_4, \ldots D_{2p} \ldots$) to the next ($D_1, D_3, \ldots D_{2p+1} \ldots$). Along the axis of each semi-strip, the detector elements $D_i$ are further spaced apart by a distance a little less than the mean length of a detector element in the direction of a ray, i.e. in the elevational direction. The angle separating the axes of the two strips is slightly greater than $\Delta\alpha$, $\Delta\alpha$ being again the instantaneous angle of coverage of a semi-strip in azimuth. Each detector element $D_{2p}$ of a semi-strip covers in the elevation angle direction at least one gap left empty by the other semi-strip ($D_{2p-1}, D_{2p+1}$).

The advantage of such a device is to make possible sufficient overlap of the even and uneven detectors. This is particularly advantageous when the image T of the source is situated at the intersection of two detectors $D_2, D_3$ along strip 2 of FIG. 5.

Strip 20 of FIG. 9 then gives, if the overlap is sufficient, detection without attenuation at least of one of the two directions $D_2$ or $D_3$ (spot T contained in one of them) whereas, in the case of strip 2 of FIG. 5, the attenuation was at least equal to 2.

The overlap is sufficient if it is greater than spot T, the image delivered by objective 1.

The circuits 6 for processing and managing the tracking and search allow the processing of signals delivered by strip 20 in the same way as those delivered by strip 2 by simple programming of circuit 65.

Figure 10:
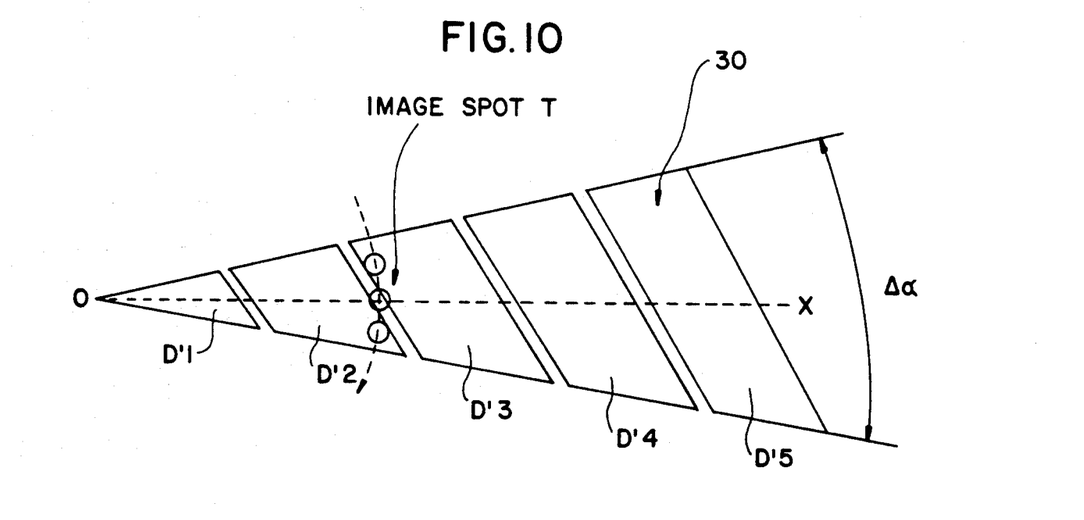
FIG. 10 is a strip variant formed of n photodetectors.

FIG. 10 shows another variant 30 of the strip formed of n detector elements having the form of a sector also $\Delta\alpha$ of a circle centred at 0, the focal point of objective 1, each elementary detector $D'_i$ having the form of a portion of this sector $\Delta\alpha$ limited by two segments parallel to each other and not perpendicular to the axis Ox of strip 30, all the detector elements being very clearly coplanar. This makes it possible, when spot T is just astride two detector elements $D'_2$ and $D'_3$ of the strip of FIG. 10, to rotate the plate 3 supporting the strip 30 through an angle equal to a fraction of $\Delta\alpha$ in one direction or in the other so as to move spot T so that it is only on a single detector element $D'_2$ or $D'_3$.

The choice of the area of the elements also takes into account the energy balance already mentioned above.

The management and control circuit 65 may have to take into account the geometry of strip 30 for rotating strip 30 in the focal plane of objective 1 for recognizing and decoding the signal emitted by the cooperative source. In the case of a programmed circuit, a simple modification of the program makes such reading possible.

Figure 11:
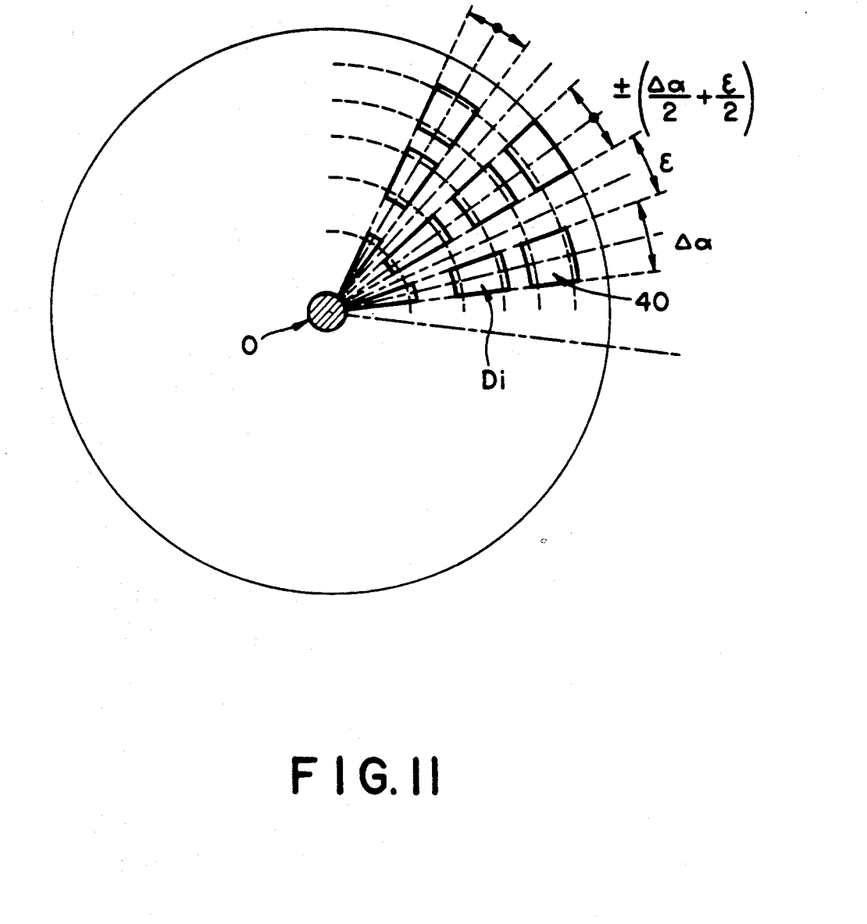
FIG. 11 is a mosaic formed of photodetector elements, also placed in the focal plane of the objective of FIG. 4 and covering almost all the optical field.

FIG. 11 shows a variant of FIG. 9. In fact, the mosaic 40 for detecting the modulated optical signal is still placed in the focal plane of objective 1 and is formed of a regular addition of m strips 20 separated by the same angular distance so as to cover the whole circumference. This variant of FIG. 11 provides better coverage of the focal plane by the two-dimensional mosaic. The detector elements $D_i$ are similar to those of strip 20 disposed in a staggered arrangement. They cover approximately half the surface of plate 3 corresponding to the total field of view of objective 1. We have then about twice less detector elements $D_i$ which are often costly; this arrangement further allows better implantation of the output wires of the detectors.

To provide total coverage of the field, it is sufficient to cause plate 3 supporting mosaic 4 to rotate alternately about point 0 and with an amplitude slightly less than $\Delta\alpha = \epsilon$ for a given period. However, such rotation is only necessary in a search or tracking period. This small rotational excursion facilitates the transport of the signals from the mobile plate 3 to the fixed electronics. Moreover, it may allow possible integration of the preamplification electronics 60 between the detector elements $D_i$.

Finally, the motor driving the plate may be more rudimentary than those required for preceding embodiments.

Figure 12:
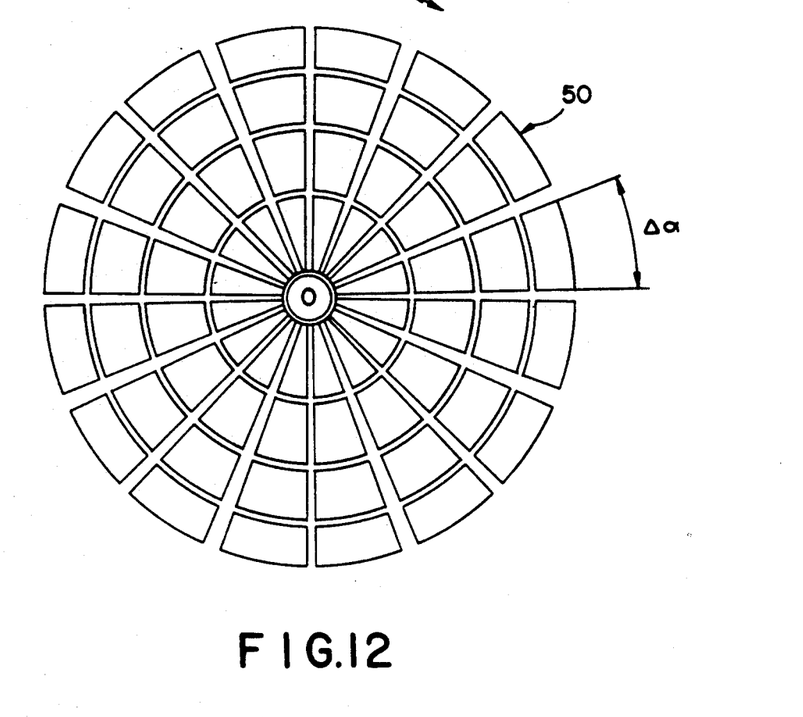
FIG. 12 shows another mosaic formed of photodetector elements, also placed in the focal plane of the objective of FIG. 4, covering the whole optical field.

FIG. 12 shows another variant of the mosaic according to the invention, called "focal plane" mosaic, i.e. covering all the field of objective 1 by photosensitive elements. Mosaic 50 is formed of the addition of two strips 2 centered at 0 so that $q \Delta\alpha = \gamma) = 360°$ where $\gamma$ is the angular distance between detector elements.

Since 100% coverage cannot be obtained, the distance $\gamma$ depends on the technology used for their manufacture; it is sufficient for the optical spot T obtained in the focal plane of the objective to be large with respect to the gap $\gamma$ between two adjacent detector elements $D_i$.

The elevation-azimuth analysis of mosaic 50 is achieved by reading the $(m \times n) + 1$ detector elements $D_i$, (n in the direction of elevation or in a given azimuth sector $\Delta\alpha$, m in the direction of the azimuth or a circle section of means radius P). The order of reading the detector elements $D_i$ depends on the application. In the example shown in FIG. 12, the mosaic 50 is formed of $4 \times 16$ detector elements $D_i$ completed by a central detector n equals 4, m equals 16.

Figure 13:
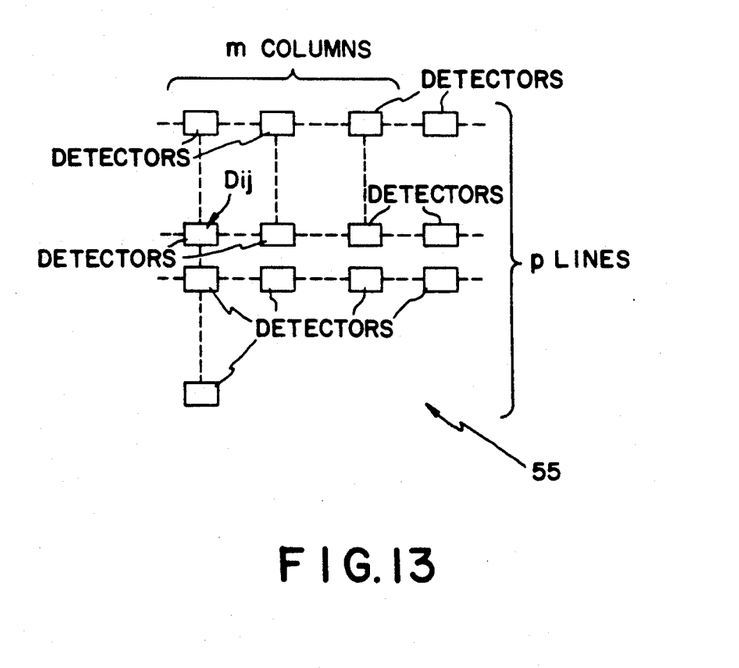
FIG. 13 is a mosaic variant, a "focal plane" mosaic.

Finally, a commercial p$\times$m line-column "focal plane" mosaic 55, as shown in FIG. 13, could again be placed fixedly in the focal plane of objective 1. It would be sufficient to adapt the signal extraction and analysis device of FIG. 7, which is again within the scope of a man skilled in the art.

The wide angle objective 1 of the invention is, as illustrated in FIG. 2, of the "fish-eye" type, for it is particularly well adapted to the transmission system described.

Similar commercial photographic objectives are constructed so as to obtain beautiful pictures; they must be free of chromatic aberrations for they work in the whole visible spectrum (0.4 to 0.7 micron) and the optical spot which is a result of the chromatic and/or geometric aberration phenomena must be the smallest possible throughout the whole field so as to obtain good image resolution. On the contrary, in the system of the invention, the optical spot T may be much larger as long as it remains within an elementary detector $D_i$ whose size is, in the applications envisaged, appreciably greater than the image element resolved on a photographic film.

In addition, the transmitters $E_1$, $E_2$ are transmitting diodes or even laser diodes for which the transmission spectrum is narrow compared with the means transmission wavelength.

The "wide angle" objectives 1 according to the invention have not then to be corrected for chromatic aberrations. Their construction is therefore much easier and their clearness performances better. In fact, the latter depend, for a given focal distance f, on the aperture, i.e. on the diameter $\phi$ of the input pupil; simultaneously obtaining a wide angle and a large aperture are incompatible with great image fineness. For the applications of the invention, more open objectives can then be constructed, thus giving good signal to noise ratios.

The choice of objective 1 may to sum up be a compromise between:
the received energy balance (signal to noise),
fineness of location required for the transmitters,
speed of analysis of the observed field.

The invention applies to the unilateral transmission of multiple sources each transmitting its own message. The device of the invention then carries out elevation-relative bearing reading of each source, which makes it possible to locate a particular source or detect the position of different sources.

What is claimed is:

1. An outdoor, short-range communications system, comprising:
    transmitter means on a support, and operative for generating a modulated light beam encoded with a message, and for transmitting the light beam away from the support; and
    receiver means spaced from the transmitter means away from the support, and operative for receiving the transmitted beam to decode the message, said receiver means including a wide-angle, substantially hemispherical objective lens system having a focal plane and a generally circular field of view covering an angular distance of ±90° in elevation, and photosensor means at said focal plane for omnidirectionally detecting the transmitted beam through the objective lens system over the entire field of view thereof.

2. The communications system according to claim 1, wherein the support is a mast on an aircraft carrier, and wherein the receiver means is mounted onboard an aircraft.

3. The communications system according to claim 2, wherein the aircraft is mounted on a deck of the carrier, and wherein the transmitter means is mounted on the mast to direct the transmitted light beam downwardly toward the deck and outwardly away from the mast.

4. The communications system according to claim 1, wherein the transmitter means includes a light source for emitting the light beam in a predetermined frequency range selected from the group consisting of infrared light frequencies, visible light frequencies, and ultraviolet light frequencies.

5. The communications system according to claim 1, wherein the transmitter means includes a plurality of transmitters mounted on individual, different, spaced-apart masts of an aircraft carrier, and wherein the receiver means includes a plurality of receivers mounted on-board individual, different aircraft.

6. The communications system according to claim 5, wherein the transmitters transmit modulated light beams encoded with the same message.

7. The communications system according to claim 5, wherein the transmitters transmit modulated light beams encoded with different messages.

8. The communications system according to claim 5, wherein the photosensor means includes a plurality of photosensors for generating electrical signals indicative of the transmitted beam incident thereon; and further comprising means for multiplexing the electrical signals over a pair of adjacent channels, means for amplifying the multiplexed signals from said channels, means for discriminating noise from the amplified signals, means for selecting the amplified signal having the least noise, and means for processing the least noisy amplified signal.

9. The communications system according to claim 1, wherein the objective lens system includes a plurality of lenses mounted within a tube having a dome extending outwardly of an aircraft.

10. The communications system according to claim 1, wherein the photosensor means includes an array of detector elements positioned in said focal plane.

11. The communications system according to claim 10, wherein the detector elements are stationarily positioned in said focal plane.

12. The communications system according to claim 10, wherein the detector elements are turned about an axis generally perpendicular to said focal plane.

13. The communications system according to claim 10, wherein the detector elements are arranged along linear rows and along linear columns.

14. The communications system according to claim 10, wherein the detector elements are located on a rotary plate having a center and an axis of rotation, and are arranged along a single radial strip extending along a radial axis from the center, each detector element having a quadrilateral shape bounded by a pair of radial lines and a pair of boundary lines perpendicular to said radial axis.

15. The communications system according to claim 10, wherein the detector elements are located on a rotary plate having a center and an axis of rotation, and are arranged along a pair of radial strips spaced angularly apart of each other, each radial strip extending along a different radial axis from the center, each detector element having a quadrilateral shape bounded by a pair of radial lines and a pair of boundary lines perpendicular to a respective radial axis, and wherein the detector elements of one of the strips are radially displaced along its radial axis relative to the detector elements of the other of the strips.

16. The communications system according to claim 10, wherein the detector elements are located on a rotary plate having a center and an axis of rotation, and are arranged along a single radial strip extending along a radial axis, each detector element having a quadrilateral shape bounded by a pair of radial lines and a pair of boundary lines inclined relative to said radial axis.

17. The communications system according to claim 10, wherein the detector elements are located on a rotary plate having a center and an axis of rotation, and are arranged along a plurality of radial strips spaced angularly apart of each other, each radial strip extending along a different radial axis from the center, each detector element having a sector shape bounded by a pair of radial lines and a pair of curved boundary lines centered on said center, and wherein the detector elements of one of the strips are radially displaced along its radial axis relative to the detector elements of an adjacent strip.

18. The communications system according to claim 17, wherein the plate is turnable in either circumferential direction about said axis of rotation.

19. The communications system according to claim 10, wherein the detector elements are located on a rotary plate having a center and an axis of rotation, and are arranged along a plurality of radial strips spaced angularly apart of each other, each radial strip extending along a different radial axis from the center, each detector element having a sector shape bounded by a pair of radial lines and a pair of curved boundary lines centered on said center, and wherein the detector elements are arranged in circular loci about said center.

* * * * *